March 10, 1936.  A. B. ELLERY  2,033,821
ACCELERATOR CONTROL DEVICE
Filed July 11, 1934  2 Sheets-Sheet 1

INVENTOR
ARTHUR B. ELLERY
BY
Ely & Barrow
ATTORNEYS

March 10, 1936.  A. B. ELLERY  2,033,821
ACCELERATOR CONTROL DEVICE
Filed July 11, 1934　　2 Sheets-Sheet 2
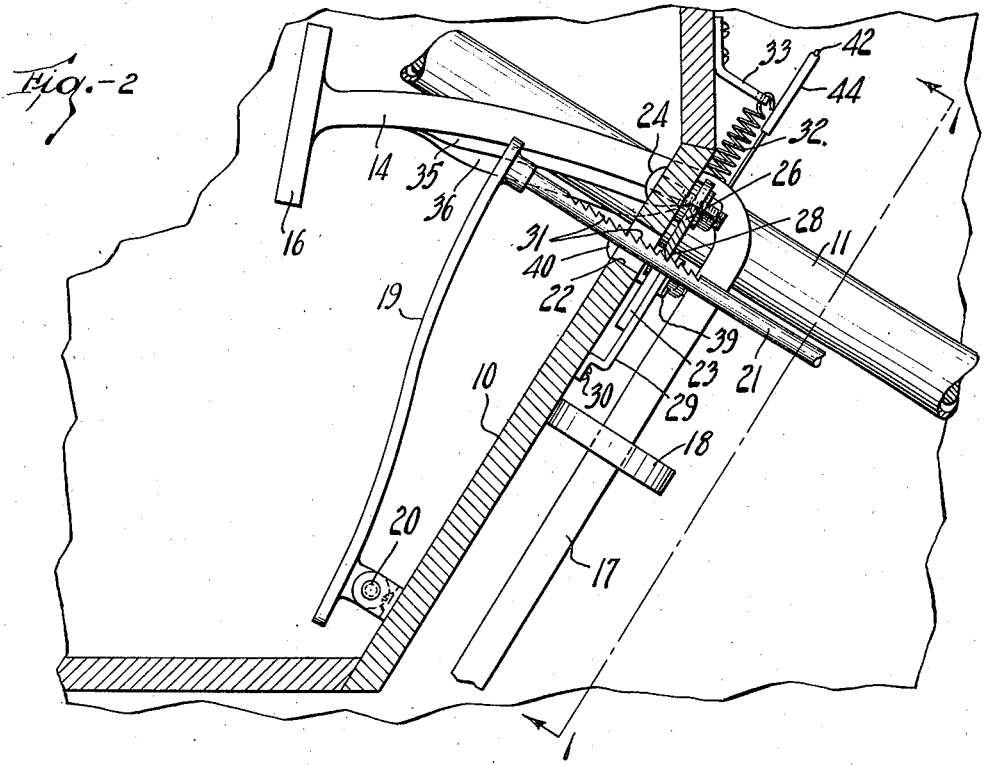
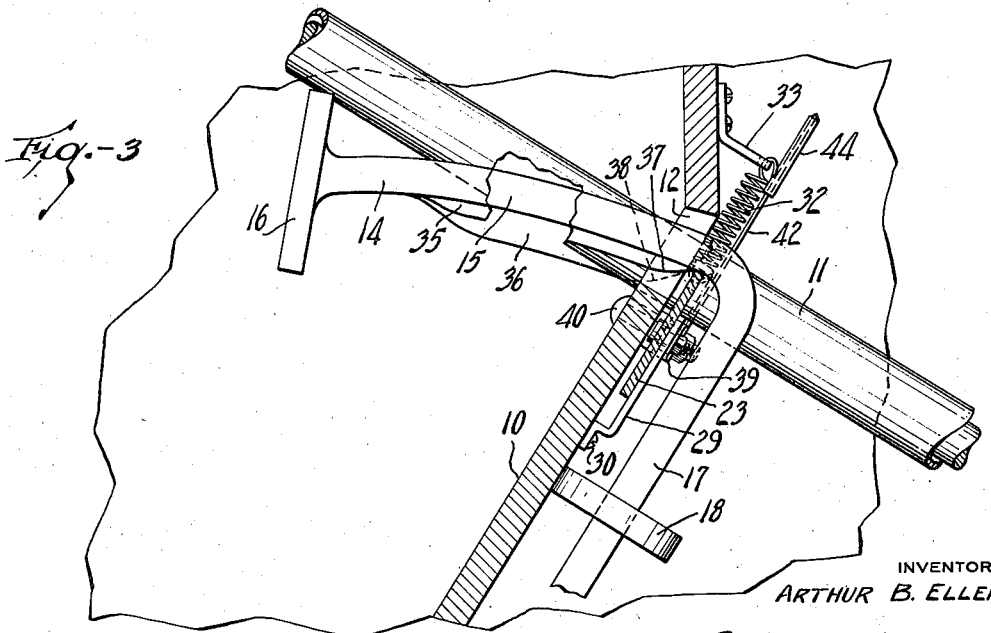
INVENTOR
ARTHUR B. ELLERY
BY Ely & Barrow
ATTORNEYS Patented Mar. 10, 1936

2,033,821

UNITED STATES PATENT OFFICE 2,033,821

ACCELERATOR CONTROL DEVICE

Arthur B. Ellery, Akron, Ohio

Application July 11, 1934, Serial No. 734,613

14 Claims. (Cl. 192—.01)

This invention relates to an improvement in an accelerator control device for installation in connection with the foot accelerator and the brake and clutch pedals of standard types of motor vehicles and has for its primary object to provide a device which is simple in construction, efficient in operation and inexpensive to manufacture.

Where continuous driving of the vehicle at a constant speed is essential to maintain an average speed, the driver very often becomes cramped by having to maintain his foot upon the accelerator pedal which results in fatigue and hinders the driver in the quick application of the brakes or operation of the clutch. The present invention therefore provides a means for holding the acclerator pedal in any desired predetermined position to obtain the desired speed of the vehicle which is instantly released upon the slightest depression of the brake or clutch pedals so as to idle the motor and thereby make it easier to retard the speed of the vehicle and to bring it to a stop or to enable the shifting of the gears. It is quite frequently desirable to operate the accelerator in the usual manner by foot and therefore a further object of the invention is to provide an improved means for latching the device in inoperative position.

With the objects above indicated and other objects hereinafter explained in view, the invention consists in the construction and combination of elements hereinafter described and claimed.

Referring to the drawings,

Figure 2 is a transverse sectional view taken on line 2—2 of Figure 1; and

Figure 3 is a transverse sectional view taken on line 3—3 of Figure 1.

Figure 1:
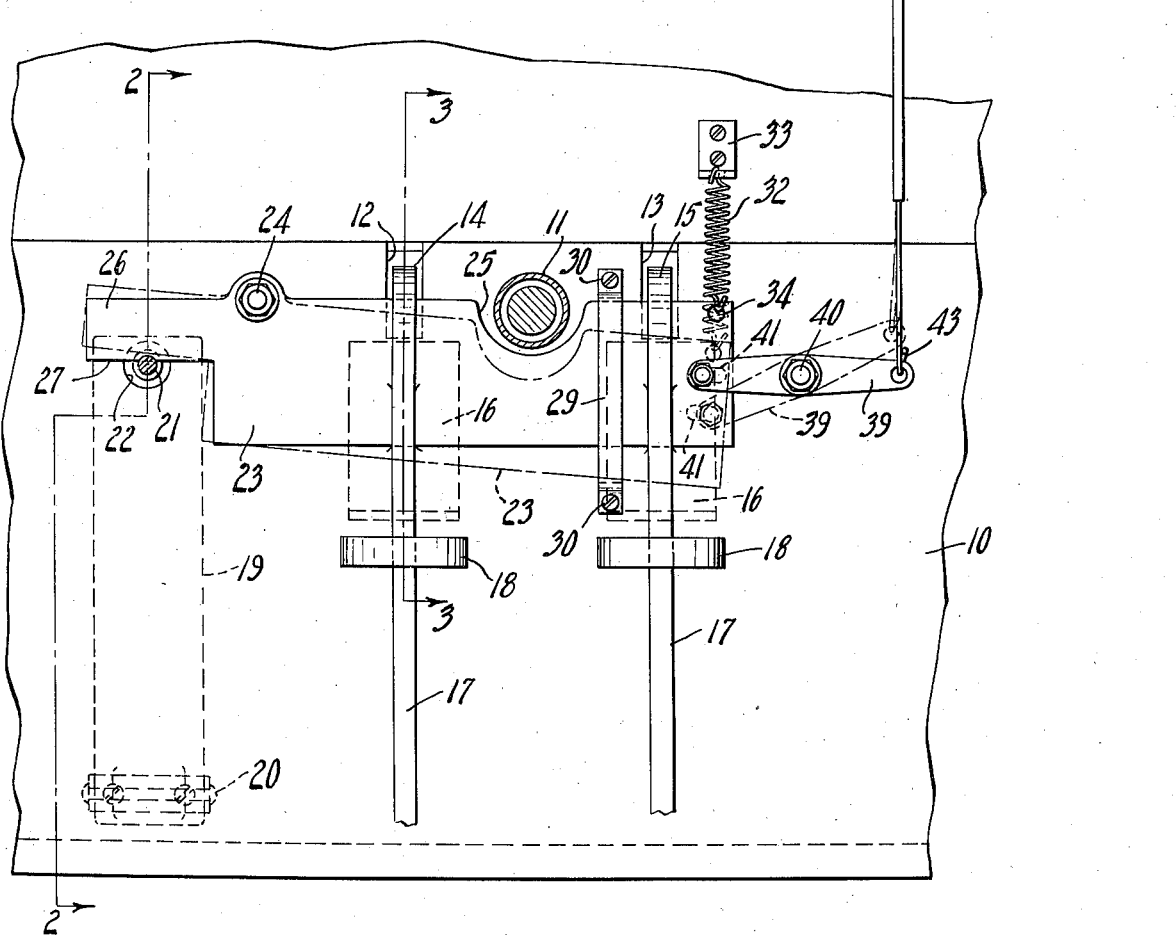
Figure 1 is a fragmentary sectional view taken on line 1—1 of Figure 2 and showing an accelerator control mechanism embodying the present invention.

In the drawings 10 indicates a floor board of the usual type found in motor vehicles and has an opening through which a steering wheel post 11 extends at one side of the floor board. Directly beneath the steering wheel post, the floor board has a pair of spaced openings 12 and 13 through which portions of a brake lever 14 and clutch lever 15 extend. The outer ends of these levers are provided with pedals 16 for engagement by the foot of the driver while the inner ends extend downwardly at 17 and are connected respectively with the brake and clutch mechanism (not shown) in the usual manner. A rubber ring 18 may be mounted on the extensions 17 and engage the under side of the floor board to absorb the impact when the brake and clutch levers are released.

An accelerator pedal 19 has its lower end pivotally connected at 20 to the floor board adjacent the brake lever 14 while the upper end is connected to one end of a rod 21. This rod 21 extends through an opening 22 in the floor board and has its opposite end connected in the usual manner to the carburetor mechanism whereby the supply of fuel to the motor may be varied and controlled.

The foregoing description is illustrative of the various elements found on the standard type of motor vehicle and do not form any part of the present invention except as they may be included in combination, but it is believed that such description will enable a clearer understanding of the application of the present invention.

A flat sheet metal plate 23 substantially rectangular in shape and of suitable gauge is pivotally connected at 24 to the under side of the floor board as more clearly shown in Figures 1 and 2. This plate is placed in close proximity to the under side of the floor board and extends transversely, the upper edge being provided with a recess 25 to prevent interference with the steering wheel post 11. The upper edge of the plate 23 also overlies the openings 12 and 13 and is normally in close proximity to the adjacent portions of the levers 14 and 15 as shown in Figure 3. The plate 23 has an extension 26 at its upper end which projects beyond the pivot 24 and a lower edge 27 which extends across the opening 22 and which has a tapered surface 28 forming a detent. The opposite end of the plate 23 is supported in a strap bracket 29 which has its ends connected at 30 by screws to the under side of the floor board in such a manner as to permit free sliding movement therein as the plate is moved about its pivot 24 but to prevent any lateral movement.

The accelerator rod 21 is provided with a plurality of transverse notches 31 on its upper side and extending longitudinally for any desirable distance to cover the range of motor speeds and these notches cooperate with the detent 28 on the plate 23 to maintain the rod 21 in any desired depressed position. A coiled spring 32 has one end connected to a bracket 33 secured to the under side of the floor board by screws while the opposite end is hooked through an opening 34 in the upper outer portion of the plate 23. This spring has sufficient tension to exert a constant pull upon the plate and tends to normally maintain the detent 28 in engagement with the selected notch 31 and at the same time maintains the upper edge of the plate in close proximity to the adjacent portion of the levers 14 and 15 adjacent the openings 12 and 13.

The brake lever 14 and clutch lever 15 are each provded with cams 35 and 36 respectively which may be attached to the under sides of the levers and have tapered surfaces 37 and 38 at the inner ends adjacent the plate 23 and adapted for engagement with the upper edge of the plate when the brake and clutch levers are depressed. Such depressions of the brake or clutch levers causes the adjacent end of the plate to be moved downwardly about the axis of the pivot 24 which simultaneously moves the detent 28 out of engagement with the notches on the accelerator rod and the latter being under normal spring tension returns to its outermost position, thus idling the motor. The cam 36 is made slightly deeper than the cam 35 by reason of the spacing between the brake and clutch levers.

At times it is desirable to operate the foot accelerator in the usual manner and therefore a latching device has been provided which consists of a lever 39 pivoted at 40 to the under side of the floor board as shown in Figure 1. One end of the lever is connected in a slotted opening 41 provided in the adjacent end of the plate while the opposite end has an opening in which one end of a wire 42 is hooked at 43. This wire may have a covering 44 within which the wire can slide longitudinally and the opposite end of the wire is connected to a knob 45 which is mounted upon the dash board 46. The knob has an extension 47 provided with a notch 48 which can be moved into engagement with a portion of the dash board to maintain the plate 23 in inoperative position as indicated by dotted lines.

In the operation of the device, the driver depresses the accelerator pedal 19 until the desired speed of the vehicle is obtained and at this point the detent 28 will engage the proper notch 31 in the accelerator rod 21 and latch the latter in this position. The driver's foot may then be removed from the accelerator pedal without affecting the speed of the vehicle and this speed will be maintained indefinitely until the driver should apply the foot brake or clutch, in which event either the cam 35 or 36 will engage the upper edge of the plate 23 causing the latter to move about the pivot 24 which results in disengaging the detent 28 from the notch in the rod 21. This accelerator rod being normally under spring pressure returns to its original position and the flow of fuel to the carburetor is reduced until the motor is idling.

The spring 32 tends to maintain the detent 28 in engagement with the notches 31 on the rod 21 and as soon as the brake or clutch is relieved the accelerator pedal may again be depressed in the manner heretofore explained.

If it should be desired to operate the accelerator in the usual manner, the knob 45 is pulled out until the notch 48 engages the dash which latches the plate 23 in a depressed position where it cannot be engaged by the accelerator rod 21 on the brake or clutch cams 35 and 36. Upon disengaging the notch 48 from the dash, the plate 23 is returned to its operative position. It will be noted that upon depression of either the brake or clutch levers the cams tend to exert an outward pressure on the plate 23 which might otherwise bend or injure the plate were it not for the provision of the bracket 29 which counteracts this force.

While I have described the preferred embodiments of the invention, it is to be understood that I am not to be limited thereto inasmuch as changes and modifications may be resorted to without departing from the spirit of the invention as defined in the appended claims.

What is claimed is:

1. In combination with the foot accelerator mechanism and the foot brake mechanism of a motor vehicle, a member pivotally mounted having one end releasably engageable with a portion of said foot accelerator mechanism for maintaining the latter in any desired position and having its opposite end disposed in close proximity to said foot brake mechanism, the application of said foot brake mechanism causing engagement with the adjacent end of said member to move the latter about its pivot and the opposite end out of engagement with said foot accelerator mechanism.

2. In combination with the foot accelerator mechanism and the foot brake mechanism of a motor vehicle, a member pivotally mounted having one end releasably engageable with a portion of said foot accelerator mechanism for maintaining the latter in any desired position and having its opposite end disposed in close proximity to said foot brake mechanism, the application of said foot brake mechanism causing engagement with the adjacent end of said member to move the latter about its pivot and the opposite end out of engagement with said foot accelerator mechanism, and resilient means connected to said member for normally maintaining the latter in operative engagement with said foot accelerator mechanism.

3. In combination with the foot accelerator mechanism and the foot brake mechanism of a motor vehicle, a member pivotally mounted having one end releasably engageable with a portion of said foot accelerator mechanism for maintaining the latter in any desired position and having its opposite end disposed in close proximity to said foot brake mechanism, the application of said foot brake mechanism causing engagement with said member to move the latter about its pivot and out of engagement with said foot accelerator mechanism, resilient means connected to said member for normally maintaining the latter in operative position, and remote control means operatively connected to said member for latching the latter in inoperative position against the action of said resilient means.

4. In combination with the foot accelerator mechanism and the foot brake mechanism of a motor vehicle, a member pivotally mounted having one end releasably engageable with a portion of said foot accelerator mechanism for maintaining the latter in any desired position and having its opposite end disposed in close proximity to said foot brake mechanism, the application of said foot brake mechanism causing engagement with the adjacent end of said member to move the latter about its pivot and the opposite end out of engagement with said foot accelerator mechanism, and a spring connected to said member for normally maintaining the latter in operative engagement with said foot accelerator mechanism.

5. In combination with the foot accelerator mechanism and the foot brake mechanism of a motor vehicle, a member pivotally mounted having one end releasably engageable with a portion of said foot accelerator mechanism for maintaining the latter in any desired position and having its opposite end disposed in close proximity to said foot brake mechanism, the application of said foot brake mechanism causing engagement with said member to move the latter about its pivot and out of engagement with said foot accelerator mechanism, and remote control means operatively connected to said member for latching the latter in inoperative position.

6. In combination with the foot accelerator mechanism and the foot brake mechanism of a motor vehicle, a plate pivotally mounted having one end positioned in close proximity to said foot brake mechanism and its other end releasably engageable with a portion of said foot accelerator mechanism to maintain the latter in any desired position, a cam secured to said foot brake mechanism and adapted to engage the portion of said plate adjacent thereto, the application of said foot brake mechanism causing said cam to engage said plate to move the latter about its pivot and thereby disengage the other portion of said plate from said foot accelerator mechanism.

7. In combination with the foot accelerator mechanism and the foot brake mechanism of a motor vehicle, a plate pivotally mounted having one end positioned in close proximity to said foot brake mechanism and its other end releasably engageable with a portion of said foot accelerator mechanism to maintain the latter in any desired position, a cam secured to said foot brake mechanism and adapted to engage the portion of said plate adjacent thereto, the application of said foot brake mechanism causing said cam to engage said plate and move the latter about its pivot to thereby disengage the other portion of said plate from said foot accelerator mechanism, and resilient means operatively connected to said plate for normally maintaining the latter in operative position.

8. In combination with the foot accelerator mechanism and the foot brake mechanism of a motor vehicle, a plate pivotally mounted having one end positioned in close proximity to said foot brake mechanism and its other end releasably engageable with a portion of said foot accelerator mechanism to maintain the latter in any desired position, a cam secured to said foot brake mechanism and adapted to engage the portion of said plate adjacent thereto, the application of said foot brake mechanism causing said cam to engage said plate and move the latter about its pivot to thereby disengage the other portion of said plate from said foot accelerator mechanism, resilient means operatively connected to said plate for normally maintaining the latter in operative position, and a remote control means operatively connected to said plate for latching the latter in inoperative position.

9. In combination with the foot accelerator mechanism and the foot brake mechanism of a motor vehicle, a plate pivotally mounted having one end positioned in close proximity to said foot brake mechanism and its other end releasably engageable with a portion of said foot accelerator mechanism to maintain the latter in any desired position, a cam secured to said foot brake mechanism and adapted to engage the portion of said plate adjacent thereto, the application of said foot brake mechanism causing said cam to engage said plate and move the latter about its pivot to thereby disengage the other portion of said plate from said foot accelerator mechanism, resilient means operatively connected to said plate for normally maintaining the latter in operative position, and means associated with said plate for rendering the latter inoperative 10. In combination with the foot accelerator mechanism and the foot brake mechanism of a motor vehicle, a plate pivotally mounted between said mechanisms and having one edge portion positioned in close proximity to said foot brake mechanism and adapted to be engaged thereby, a second edge portion on the opposite side of said plate releasably engageable with a portion of said foot accelerator mechanism for maintaining the latter in any desired position, the application of said foot brake mechanism causing movement of said plate about its pivot to disengage said second edge portion from said foot accelerator mechanism.

11. In combination with the foot accelerator mechanism, the foot brake mechanism and the clutch mechanism, a member pivotally mounted having one end releasably engageable with a portion of said foot accelerator mechanism for maintaining the latter in any desired position and having its opposite end disposed in close proximity to said foot brake mechanism and said clutch mechanism, the application of said brake mechanism or said clutch mechanism causing engagement with said plate to move the latter about its pivot and out of engagement with said foot accelerator mechanism.

12. In combination with the foot accelerator mechanism, the foot brake mechanism and the clutch mechanism, a member pivotally mounted having one end releasably engageable with a portion of said foot accelerator mechanism for maintaining the latter in any desired position and having its opposite end disposed in close proximity to said foot brake mechanism and said clutch mechanism, cams secured to said foot brake mechanism and said clutch mechanism and each adapted independently to engage said plate, the application of said brake mechanism or said clutch mechanism causing the respective cam to engage said plate and move the latter about its pivot and out of engagement with said foot accelerator mechanism.

13. In combination with the foot accelerator mechanism, the foot brake mechanism and the clutch mechanism, a member pivotally mounted having one end releasably engageable with a portion of said foot accelerator mechanism for maintaining the latter in any desired position and having its opposite end disposed in close proximity to said foot brake mechanism and said clutch mechanism, the application of said brake mechanism or said clutch mechanism causing engagement with the adjacent end of said plate to move the latter about its pivot and the opposite end out of engagement with said foot accelerator mechanism, and yieldable means operatively connected to said plate for maintaining the latter in operative engagement with said foot accelerator mechanism.

14. In combination with the foot accelerator mechanism, the foot brake mechanism and the clutch mechanism, a member pivotally mounted having one end releasably engageable with a portion of said foot accelerator mechanism for maintaining the latter in any desired position and having its opposite end disposed in close proximity to said foot brake mechanism and said clutch mechanism, cams secured to said foot brake mechanism and said clutch mechanism and each adapted independently to engage said plate, the application of said brake mechanism or said clutch mechanism causing the respective cam to engage said plate and move the latter about its pivot and out of engagement with said foot accelerator mechanism, and yieldable means operatively connected to said plate for maintainnig the latter in operative position.

ARTHUR B. ELLERY.